United States Patent
Baldwin

[11] Patent Number: 6,150,609
[45] Date of Patent: Nov. 21, 2000

[54] MULTI-PURPOSE DECORATIVE COVER FOR BREAKER PANEL

[76] Inventor: Allen M. Baldwin, 1996 Gulf Stream Ct., Forest Hill, Md. 21050

[21] Appl. No.: 09/243,432

[22] Filed: Feb. 3, 1999

[51] Int. Cl.[7] .................................................. H02G 3/14
[52] U.S. Cl. ........................................... 174/66; 220/241
[58] Field of Search ........................... 174/66, 67, 58; 220/241, 242, 3.8; 33/528; 361/658, 654; D8/353; 439/137

[56] References Cited

U.S. PATENT DOCUMENTS

| D. 295,400 | 4/1988 | Wung . | |
|---|---|---|---|
| D. 308,814 | 6/1990 | Kintigos et al. . | |
| D. 318,652 | 7/1991 | Buchanan . | |
| 1,748,234 | 2/1930 | Loeb . | |
| 1,835,042 | 12/1931 | Hammer . | |
| 1,990,756 | 2/1935 | Saaf . | |
| 2,488,035 | 11/1949 | Pistone . | |
| 2,612,283 | 9/1952 | Cole . | |
| 2,878,955 | 3/1959 | Hagan . | |
| 3,315,556 | 4/1967 | Speck . | |
| 3,480,344 | 11/1969 | Goodridge . | |
| 3,532,938 | 10/1970 | Holman et al. . | |
| 3,610,717 | 10/1971 | Van Nostrand . | |
| 3,618,804 | 11/1971 | Krause . | |
| 3,707,653 | 12/1972 | Coffey et al. . | |
| 3,808,509 | 4/1974 | Frazier . | |
| 3,840,692 | 10/1974 | Wells | 174/66 |
| 4,707,564 | 11/1987 | Gonzales | 174/66 |
| 4,800,239 | 1/1989 | Hill . | |
| 5,081,560 | 1/1992 | Donnerstag . | |
| 5,099,087 | 3/1992 | Barrell | 174/66 |
| 5,153,816 | 10/1992 | Griffin . | |
| 5,180,886 | 1/1993 | Dierenbach et al. . | |
| 5,245,507 | 9/1993 | Erickson | 361/641 |
| 5,496,104 | 3/1996 | Arnold et al. | 312/204 |
| 5,675,125 | 10/1997 | Hollinger | 174/66 |
| 5,824,116 | 10/1998 | Zutler | 8/471 |
| 5,874,693 | 2/1999 | Rintz | 174/66 |
| 5,929,379 | 7/1999 | Reiner et al. | 174/66 |

*Primary Examiner*—Kristine Kincaid
*Assistant Examiner*—Dhiru R Patel
*Attorney, Agent, or Firm*—Rosenberg, Klein & Lee

[57] ABSTRACT

A decorative kit for wall mountable electrical panel board includes a plurality of interchangeable decorative front members, each of which presents an aesthetically viable structure. Each decorative front member has male coupling members at its coupling side matable with female coupling members on the side edge of the cover plate of the electrical panel board, so that the decorative front member is capable of swinging movement relative to the cover plate. Being closed, the decorative front member camouflages the unattractive front surface of the electrical panel board behind it, and being opened, the decorative front member allows easy access to the electrical elements in the load center.

9 Claims, 9 Drawing Sheets

MULTI-PURPOSE DECORATIVE COVER FOR BREAKER PANEL

BACKGROUND OF THE INVENTION

1. Field of the Invention

The present invention relates to electrical panel boards, and more particularly, to electrical power distribution panel boards mounted in walls of buildings and having decorative front covers functioning as a decorative display and allowing the access to circuit breakers or fuses within the panel board box.

Even more particularly, the present invention relates to a retrofitting kit installed on a wall mountable electrical power distribution panel board for camouflaging generally unattractive conventional panel boards and providing a desirable outlook which may be changed from time to time according to the preference of the user of the kit.

Further, the present invention relates to a retrofitting kit for wall mountable electrical power distribution panel boards, easily installable onto the panel board and including a plurality of replaceable decorative front covers swingably attachable to the panel board and includes hardware for coupling the decorative front cover to the panel board. Such a kit allows replaceability whenever needed or desired.

The present invention also relates to a method for providing an aesthetically attractive look to wall mountable electrical power distribution panel boards in accordance with the taste and preference of a habitant of the building where the electrical power distribution panel boards are mounted and also in accordance with the decorative style of the residence or office.

2. Prior Art

Electrical panels installed at power distribution centers include boxes for housing various components used for switching, metering, bus bar circuit interconnections, and overload electrical protection.

As shown in FIGS. 1 and 2 labeled "Prior Art", a conventional electrical panel board 10 includes a panel board box 11 installed in a recess in the wall 12 and a cover plate 13 covering the opening 14 of the panel board box 11. Servicing and/or installation of electrical components is ultimately required, and thus, a cover for the electrical panel board must provide easy access thereto. Typically, the cover plate 13 is provided with a door 15 openable to allow access to electrical elements of the load center (not shown). The door 15 may be lockable by a locking mechanism 16 to maintain security considerations.

U.S. Pat. No. 3,808,509 describes an electrical panel board cover which includes a cover plate for covering the open side of an electrical panel board box and a flange secured to the cover plate at the side by a hinge. The flange is secured to the panel board box by studs, thereby securing the cover plate to the panel board box. The cover plate has an access door somewhat in a center region thereof which is supported on a hinge, providing a swinging movement of the access door with respect to the cover plate. The cover plate, also swings or rotates with respect to both the flange and the wall to which the electrical panel board is mounted.

U.S. Pat. No. 3,480,344 discloses an electrical panel board having a panel board box provided with a front closure having an access door which may be locked by a key operated locking mechanism in order to prevent unwanted intrusion and access to the electrical components of the electrical panel board.

Typically, in real life situations, architects and engineers designing residential, office, and/or industrial buildings, cannot afford to spend sufficient time to plan positioning of the electrical panel boards in a room which is not often used and where the outlook of the electrical panel board would not be of importance to the habitants of the residence or the office. Unfortunately, many times, the electrical panel boards are placed in a haphazard manner in places meeting minimum safety requirement regulations. Sometimes, electrical panel boards may be found on the walls of a hall, a foyer area, or in the kitchen. Naturally, residents or decorators try to hide the unattractive outlook of the electrical panel board by covering them with heavy mirrors, or painting the panel board covers shut (which makes it nearly impossible to open them). In other instances, the panel boards are covered with pieces of furniture, pictures, etc. This type of covering is not a safe way of camouflaging the electrical panel board, and do not provide a ready access to electrical components within the panel board boxes.

An electrical wall mountable power control/distribution device provided with a decorative cover is described in U.S. Pat. No. 5,153,816. A face plate assembly is releasably attached to the wall box by means of press-fit connectors on the face plate adapted for interlocking engagement with press-fit studs carried on the coupling plate installed within the wall box. The face plate housing has an elongated slot which opens into the device cavity. A decorator insert card is adapted for slidable insertion into and withdrawal from the device cavity through the housing slot. In one embodiment, the decorator insert card may be installed and replaced by releasing the face plate housing from the press fit connector, and inserting or withdrawing the decorator insert card through the housing slot. In an alternative embodiment, the decorator insert may be installed and replaced without requiring removal of the face plate assembly by inserting or withdrawing the decorator insert card through the housing slot which intersects a web along the top edge of the face plate housing.

The decorative structure provides for harmony with room decor such as wallpaper, drapes, furnishings, and the like; and also provides for replacement of displays whenever needed or desired. Disadvantageously, the face plate with the decorator insert impedes the ready access to the electrical component of the electrical panel board which is unacceptable for electrical panel boards installed in residences, offices, and/or industrial buildings. Although the device allows for diverse decorative inserts, it is not intended for other than flat picture-like decorative displays.

Therefore, not only a larger number of diverse options are needed for decorating and camouflaging electrical wall mountable panel boards to meet requirements of different tastes, styles, and provide for harmony with room decor, but also a decorative display, which would not obstruct easy access to the electrical component of the panel board is highly desirable for use in residential, office, and/or industrial buildings.

SUMMARY OF THE INVENTION

It is an object of the present invention to provide a retrofitting decorative kit for camouflaging the unattractive aspects of conventional electrical panel boards and bringing about aesthetically pleasant housings which harmonize with the interior of a room where the electrical panel board is installed.

It is another object of the present invention to provide modified electrical panel boards (prepared at a manufacturing facility for receiving and supporting decorative covers thereon), as well as a decorative kit for the modified panel boards.

It is a further object of the present invention to provide a retrofitting kit including a plurality of distinct decorative covers which are easily installable to the electrical panel board and replaceable in an interchangeable manner. The retrofitting kit includes hardware for installation of each decorative cover to the electrical panel board.

It is another object of the present invention to provide a method of camouflaging a conventional electrical panel board (as well as camouflaging of modified electrical panel boards) mounted on the wall with attractive and aesthetically pleasant decorative covers.

The present invention teaches two distinct decorative kits for wall mountable electrical panel boards, one decorative kit for conventional electrical panel boards, and another decorative kit for modified electrical panel boards. Also, the present invention covers a mounting technique for installing a decorative kit of the present invention onto a conventional electrical panel board, as well as mounting techniques for installing the decorative kit for modified electrical panel boards.

According to the teachings of the present invention, the decorative kit for conventional wall mountable electrical panel boards includes a plurality of interchangeable decorative front members, each having at least one, but preferably three, male type coupling members affixed along a coupling side thereof in combination with a position template.

At least one, but preferably three, female type coupling members are affixed to the side edge of the cover plate of the electrical panel board for further male/female coupling with the male type coupling members mounted on the decorative front member.

It is essential that during mounting of the elements of the decorative kit to the electrical panel board, the female type coupling members (preferably, in the form of barrel type hinges) are positioned and secured to the cover plate of the electrical panel board in precise registration with the male type coupling members on the decorative front members. For this purpose, the decorative kit is provided with a position template, which is a substantially rectangular planar member foldable symmetrically along a longitudinal axis thereof, which has at least one, but preferably three, indicia, or openings, indicating where to position a barrel type hinge on the side edge of the cover plate of the electrical panel board. The position template is folded symmetrically and secured to the side edge of the cover plate with the longitudinal axis of the rectangular plane member coinciding with the side edge of the cover plate. The barrel type hinges are positioned within the opening in the position template and secured in position by a plurality of fasteners provided with the decorative kit.

A plurality of the interchangeable decorative front members may include two and three dimensional structures for different applications. Thus, they may be used in spice rack concept for kitchen applications; as a cabinet front concept for kitchen, hall, and room applications; a wall clock concept, for hall and foyer applications; a chalkboard-cork board concept for kitchen application; a mirror-in-frame or painting-in-frame application for room and foyer, etc.

The decorative kit of the present invention is installable for flush mount electrical panel boards when the panel board box is installed in a recess within a wall or for surface mounted electrical panel boards which extend external the wall surface. Teachings of the present invention are also applicable to electrical panel boards which have flanges extending outwardly from the opening of an electrical panel board box as well as for panel boards without flanges.

Viewing another aspect of the subject system, the present invention is a decorative kit adapted to be mounted to a modified electrical panel board when a modified cover plate has pre-welded (or somehow else pre-secured to the cover plate) coupling members, which include a plurality of interchangeable decorative front members, each carrying at least one, but preferably three, male coupling members couplable to the female coupling members pre-positioned and pre-secured onto the modified cover plate of the modified electrical panel board. The decorative kit for a modified electrical panel board, in contrast to the decorative kit for a conventional electrical panel board, is not provided with a plurality of barrel type hinges (or other female coupling members), since they are already pre-affixed on the modified cover plate, nor is a position template needed in such a decorative kit, since alignment of the male and female coupling members is provided by manufacturers of the modified cover plate and decorative kit, so that the end user needs only to select one of the plurality of decorative front covers from the decorative kit and engage the coupling members of the selected decorative front member with the coupling members of the modified cover plate.

Viewing another aspect of the subject system, the present invention is directed to a method of installing a decorative front member onto a conventional electrical panel board mounted into a wall, which includes the following mounting technique steps:

providing a decorative kit which includes a plurality of interchangeable decorative front members, each carrying male coupling members, and female coupling members, preferably in the form of a barrel type hinge, which are matable with the male coupling member on the decorative front member;

removing a cover plate of the conventional electrical panel board from the wall where it was mounted;

positioning and securing the barrel type hinges at the side edge of the cover plate in alignment with the male coupling members on the decorative front members;

installing the cover plate carrying the barrel type hinges back to the position on the wall; and mounting the selected decorative front member to the panel board by mating the male and female coupling members to each other.

In order to interchange or replace one decorative front member to another, the end user simply has to disengage male/female coupling members on the cover plate and the decorative front member, thereby removing the decorative front member from the cover plate, and to slide the male coupling members on another selected decorative front member onto the female coupling members on the cover plate.

It is essential, that the barrel type hinges are positioned and secured to the cover plate in alignment with the male coupling members on the selected decorative front member. For this purpose, a position template provided within the decorative kit is used. The position template is folded symmetrically along the longitudinal axis and secured to the side edge of the cover plate with the coupling edge coinciding with the longitudinal axis of the position template. The barrel type hinges are then secured within or in close proximity to the indicia on the position template, which for example, may be an opening in the position template, however, other indicia are also contemplated in the scope of the present invention.

Viewing still another aspect of the present invention, such teaches a method of installing a decorative front member onto a modified electrical panel board. According to this method, a manufacturer provides the end user with a modified electrical panel board which includes a modified cover plate having at least one, but preferably three, coupling members which are pre-welded or otherwise pre-secured to the modified cover plate. The modified electrical panel board is installed in the wall and in order to mount the decorative front cover to the modified electrical panel board, the end user does not have to remove the modified panel board from the wall before installing the decorative front cover. The end user selects a respective decorative front cover which has male type coupling members secured along the coupling side thereof and slides these male type coupling members into respective female type coupling members pre-secured to the coupling edge of the modified cover plate. Replacing of the decorative front covers is also a simple procedure and is accomplished by removing one decorative front cover by disengaging male and female coupling members, and installing another desired decorative front member.

These and other novel features and advantages of this invention will be fully understood from the following detailed description and the accompanying drawings.

DETAILED DESCRIPTION OF THE PREFERRED EMBODIMENT

Figure 2:
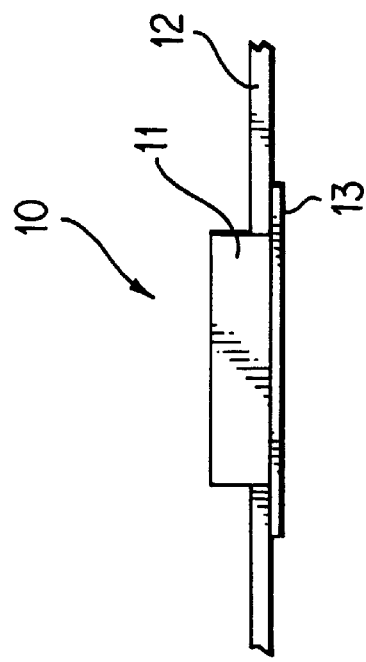
FIG. 2 is a top view of the prior art electrical panel board mounted on a wall.
Figure 1:
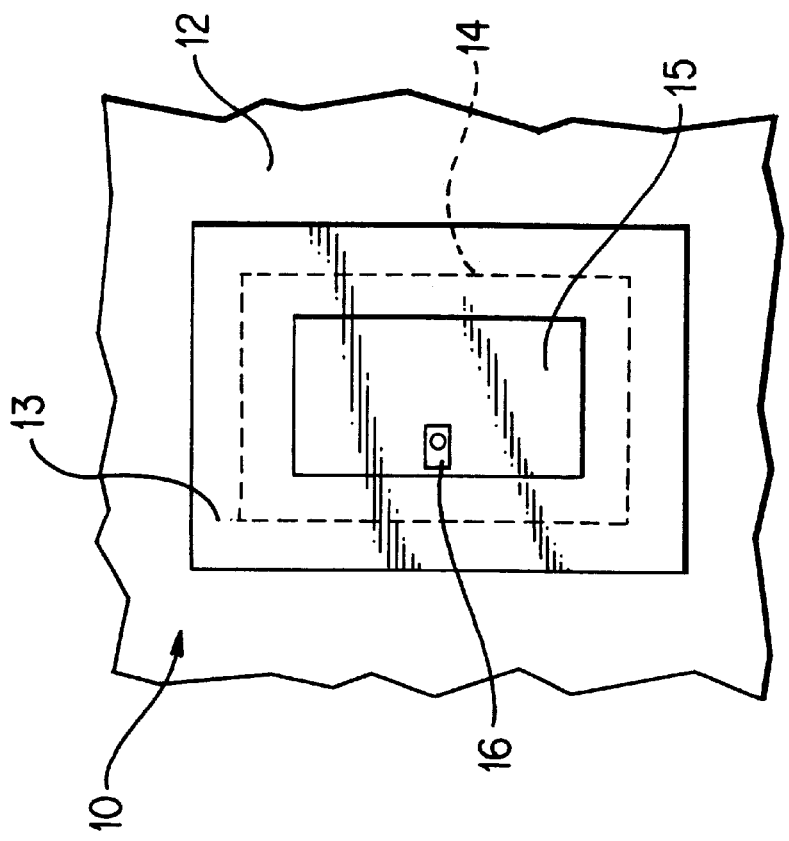
FIG. 1 is a front view of prior art wall mountable conventional electrical panel board.
Figure 3:
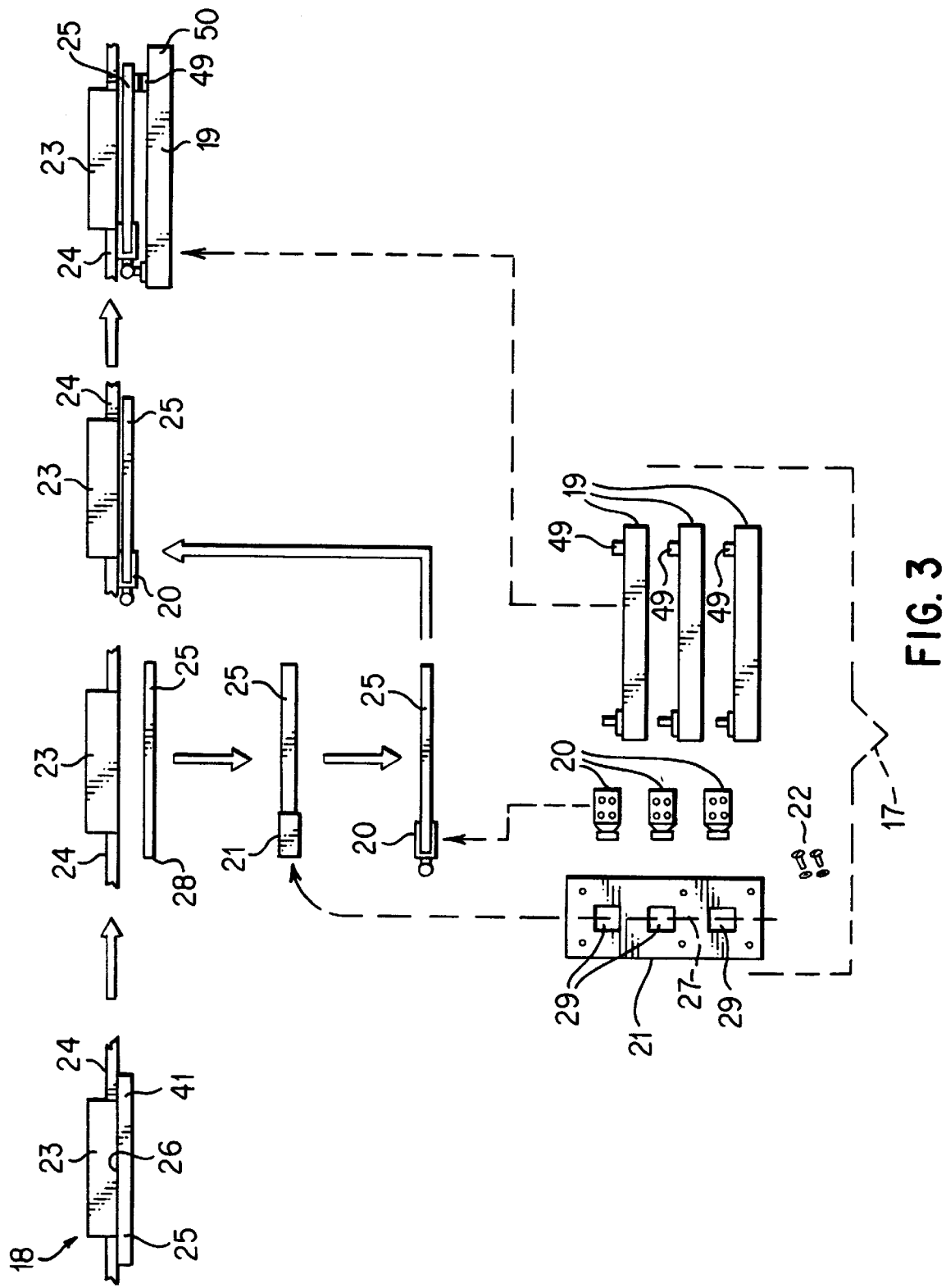
FIG. 3 is a schematic representation of a technique for installation of a decorative front member of the prior art to a conventional electrical panel board.

Referring to FIG. 3, a decorative kit 17 for wall mountable conventional electrical panel board 18 is shown which includes a plurality of decorative front members 19, a multiplicity of barrel type hinges 20, a position template 21, and fasteners 22. The conventional electrical panel board 18 includes a panel board box 23 mounted in a recess in the wall 24 and a cover plate 25 covering the opening 26 of the panel board box 23.

In order to install the decorative front member 19 to the cover plate 25 of the conventional electrical panel board 18, the cover plate 25 is removed from the conventional electrical panel board 18, the position template 21 removed from the decorative kit 17 is folded along the longitudinal central axis 27 thereof, and slid over the cover plate 25 at the side edge 28 thereof.

Figure 10:
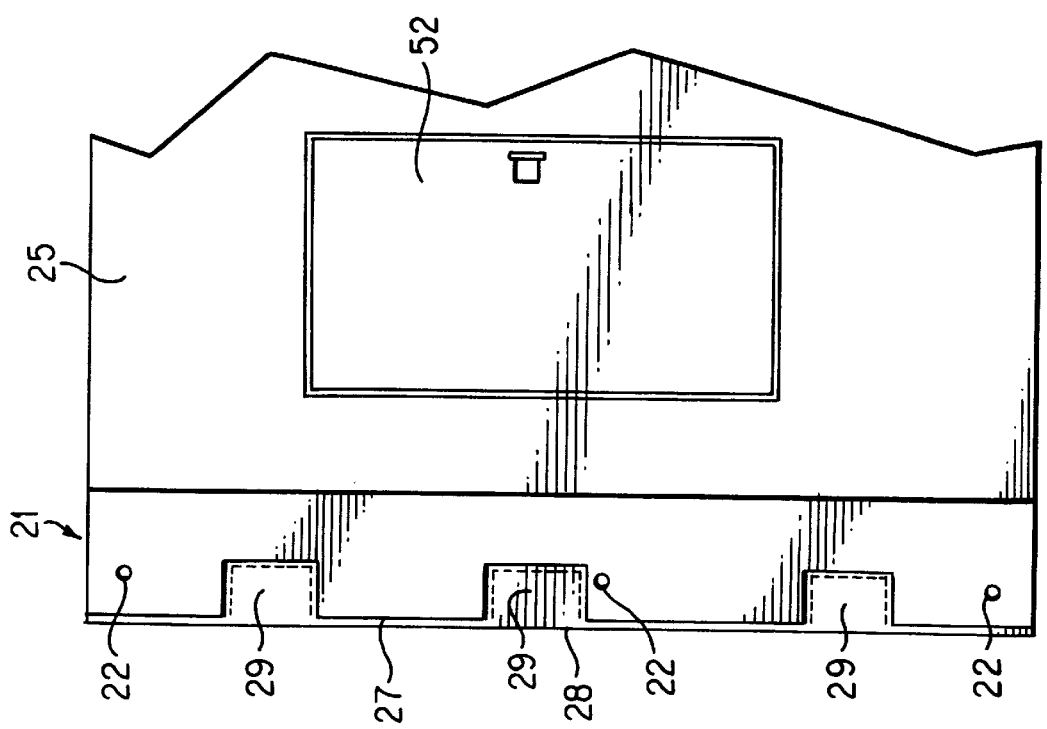
FIG. 10 is a plan view of the cover plate of the electrical panel board with the position template affixed to the side edge thereof.

After the position template 21 is disposed at the cover plate 25, as shown in FIG. 10, the position template 21 is secured to the cover plate 25 by the fasteners 22. Openings 29 in the position template 21 indicate location of the barrel type hinges 20 on the cover plate 25.

Figure 5:
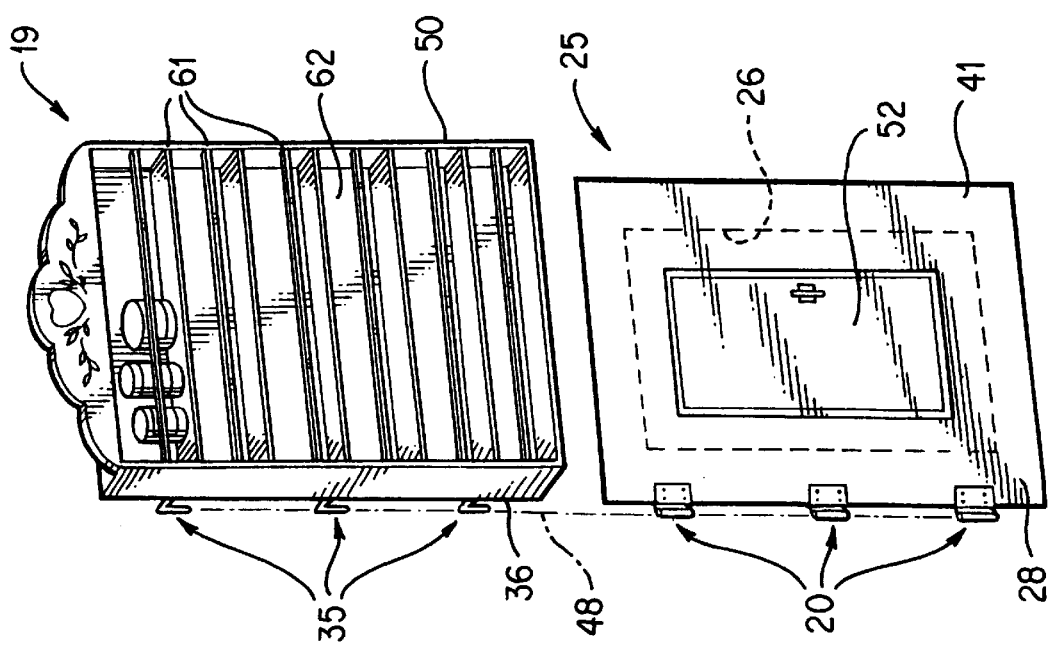
FIG. 5 is a decorative front member of a spice rack concept ready to be installed to the cover plate of the electrical panel board according to the present invention.
Figure 7:
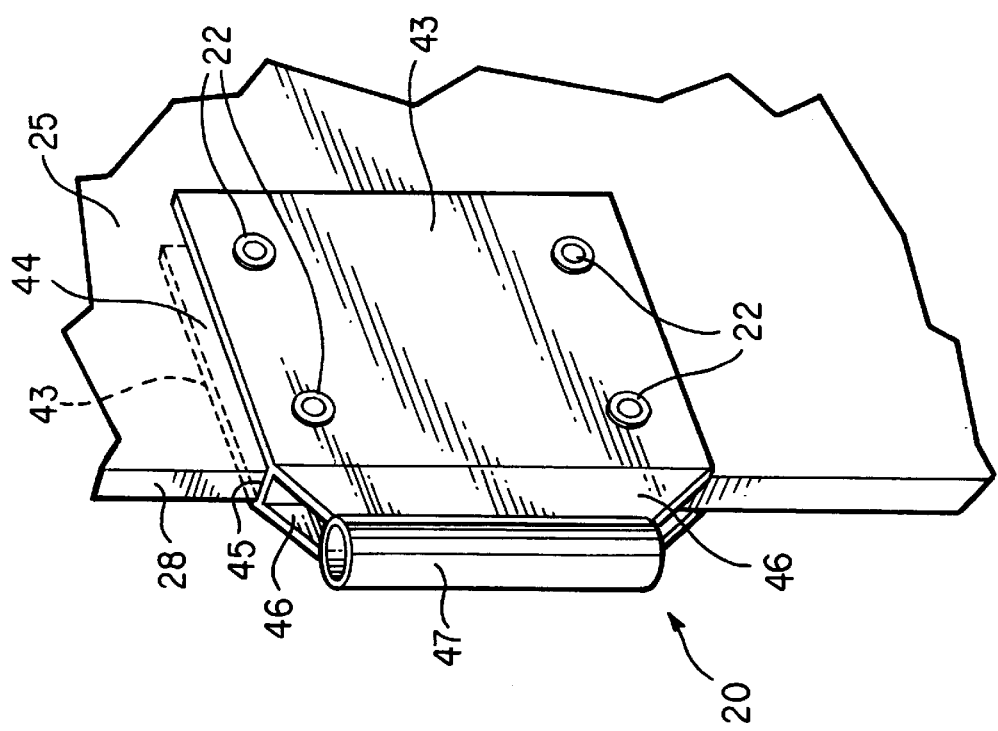
FIG. 7 is a cut-away perspective view, somewhat on enlarged scale of a barrel type hinge secured to the cover plate of the conventional electrical panel board.

Although shown as rectangular openings, any type of indicia for indicating position of the barrel type hinges 20 are contemplated in the scope of the present invention. Once the location of the barrel type hinges 20 is determined, the barrel type hinges 20, one after the other, are slid over the side edge 28 of the cover plate 25 and are secured thereto within the openings 29 of the position template 21 which is shown in FIGS. 5 and 7, and will be further described in following paragraphs. The fasteners 22 are used to secure the hinges 20 to the cover plate 25.

After being provided with the barrel type hinges, the cover plate 25 is returned to the electrical panel board 18 and is secured thereto by conventional methods. Being so modified by the hinges 20 and the position template 21 contained in the decorative kit 17, the cover plate 25 is prepared for receiving any one of the decorative front members 19 thereon to camouflage the unattractive front surface of the conventional cover plate 25 and to bring a desired look to the electrical panel board acceptable from an aesthetic standpoint.

After the barrel type hinges 20 are affixed to the cover plate 25 at the locations predetermined by the indicia 29 of the position template 21, the position template 21 may be removed from the cover plate 25.

Figure 4:
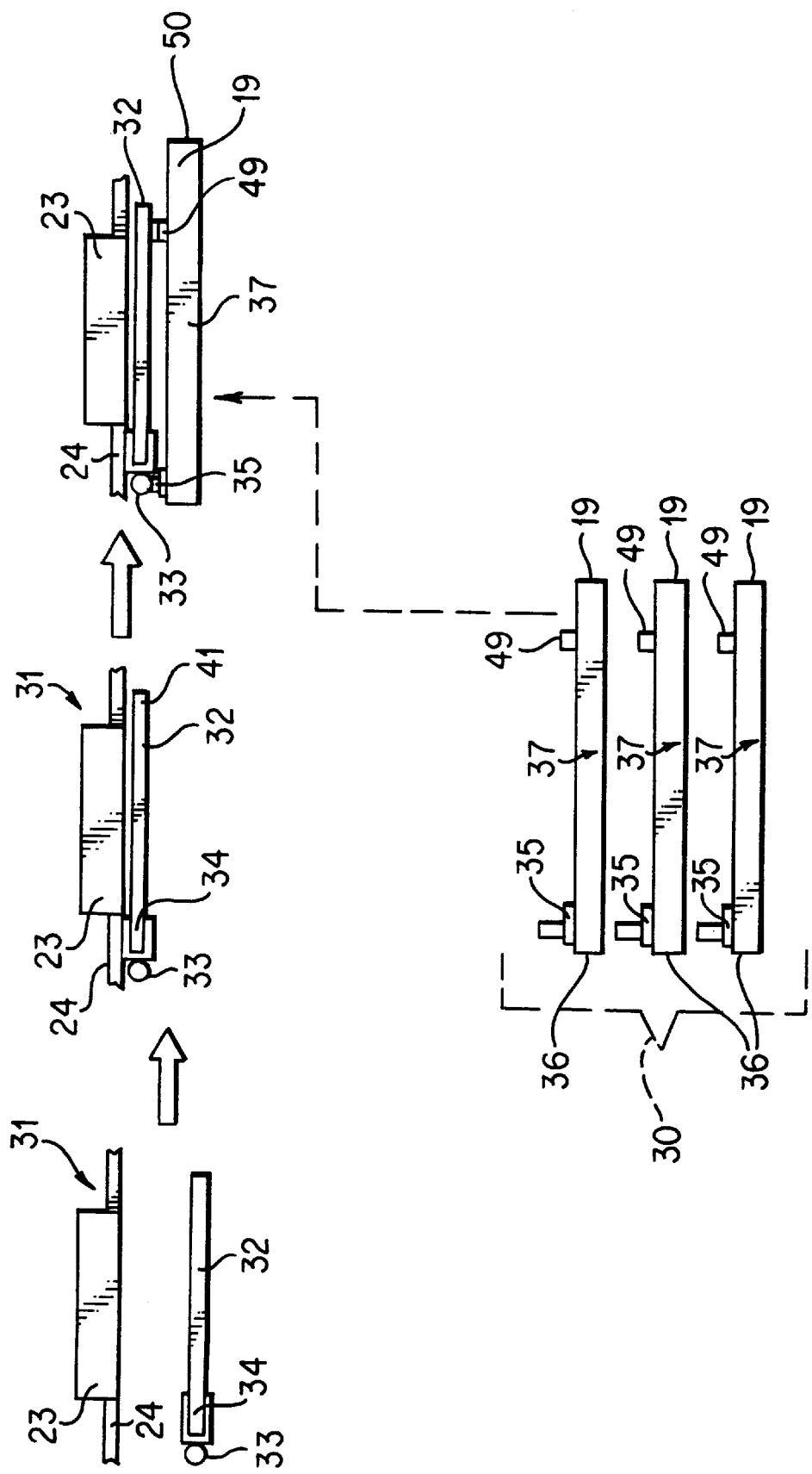
FIG. 4 is a schematic representation of a technique for installation of the decorative front member of the present invention to the modified electrical panel board.

An alternative embodiments, a decorative kit 30 of the present invention, shown in FIG. 4, is intended for decorating modified electrical panel boards 31 which include a conventional panel board box 23 mounted in the wall 24 and a modified cover plate 32 to which female type coupling members 33 are pre-welded, or otherwise secured at predetermined locations on the edge 34 of the modified cover plate 32.

The decorative kit 30 for the modified electrical panel board 31 includes a plurality of the decorative front members 19 similar to those in the decorative kit 17 which are provided with male type coupling members 35 at the coupling side 36 thereof. The male type coupling members 35 are disposed in precise alignment with the female type coupling member 33 on the modified cover plate 32, so that in order to install the decorative front member 19 to the modified cover plate 32, the male type coupling members 35 are slid into the female type coupling members 33 on the modified cover plate 32, thereby providing rotative coupling of the decorative front member 19 with the modified cover plate 32 about the axis of rotation coinciding with the central axis of the female type coupling member 33.

Although the decorative kits 17 and 30 are implemented in two different embodiments (the decorative kit 17 for conventional electrical panel boards 18 and the decorative kit 30 for a modified electrical panel board 31), they have common general principles equally applicable for both embodiments which are as follows:

decorative kit for wall mountable electrical panel board includes a plurality of interchangeable decorative front members serving to cover the front unattractive surface of the electrical panel board and provided with coupling members mating with respective coupling members provided on the electrical panel board for rotative coupling engagement of a selected decorative front member about the axis of rotation coinciding with or parallel to the coupling edges of the decorative front member and the cover plate of the electrical panel board, so that the decorative front member is capable of rotative or swinging displacement with respect to the cover plate.

Figure 14:
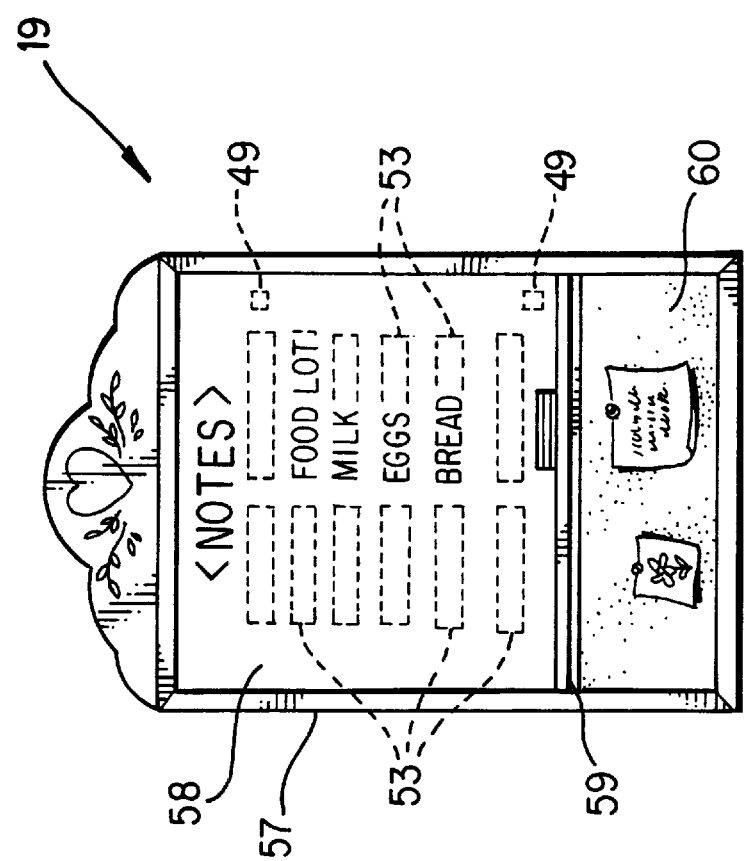
FIG. 14 shows a chalkboard-cork board concept of the decorative front member of the present invention for a kitchen application; and, FIG. 15 shows a cabinet front concept for the front decorative member of the present invention for kitchen, hall, and/or room applications.
Figure 13:
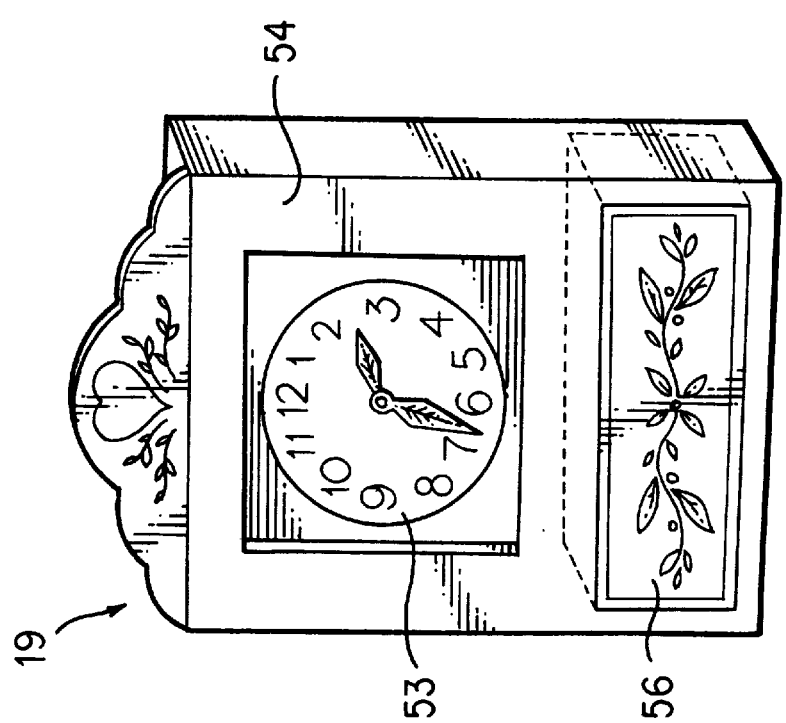
FIG. 13 shows a wall clock concept of the front decorative member of the present invention for hall and/or foyer applications.
Figure 15:
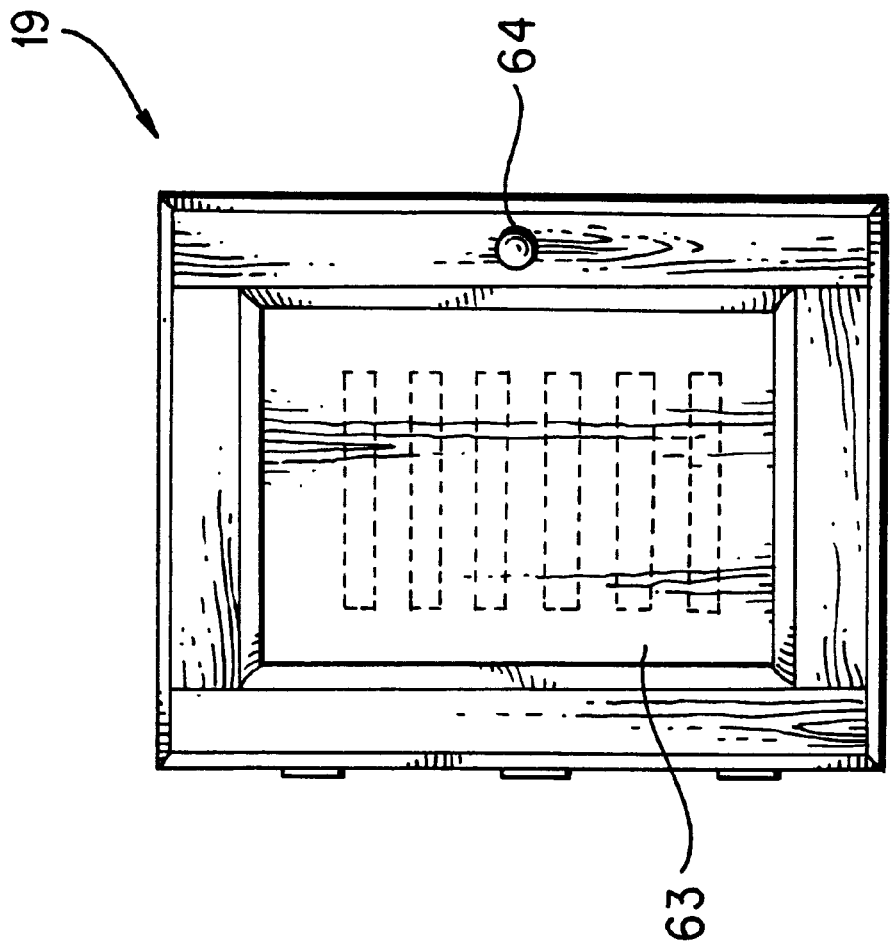

Each decorative kit, 17 or 30, includes a plurality of interchangeable decorative front members 19 which may be implemented in different modifications, for example, in spice rack concepts, shown in FIG. 5, for kitchen applications; in wall clock concepts, shown in FIG. 13, for hall and/or foyer applications; in chalkboard/cork board concepts, as shown in FIG. 14, for kitchen application; in cabinet concept, as shown in FIG. 15, for kitchen or hall application; as mirror-in-frame concept, or picture-in-frame, not shown, etc. Many other concepts are contemplated in the scope of the present invention, the choice of designer and the user of the decorative kit 17 and/or 30.

As best shown in FIGS. 3–8, the decorative front member 19 includes a panel 37 displaying a desired look or indicia, and having the coupling side 36 to which male type coupling members 35 are pre-welded, glued, or otherwise adhered at predetermined locations on the coupling sides 36, so that to uniformly distribute weight of the decorative front member 19 along the coupling side 36. Although one or two male type coupling members 35 may perform the function intended, it is preferred to employ three male type coupling members 35.

Figure 8:
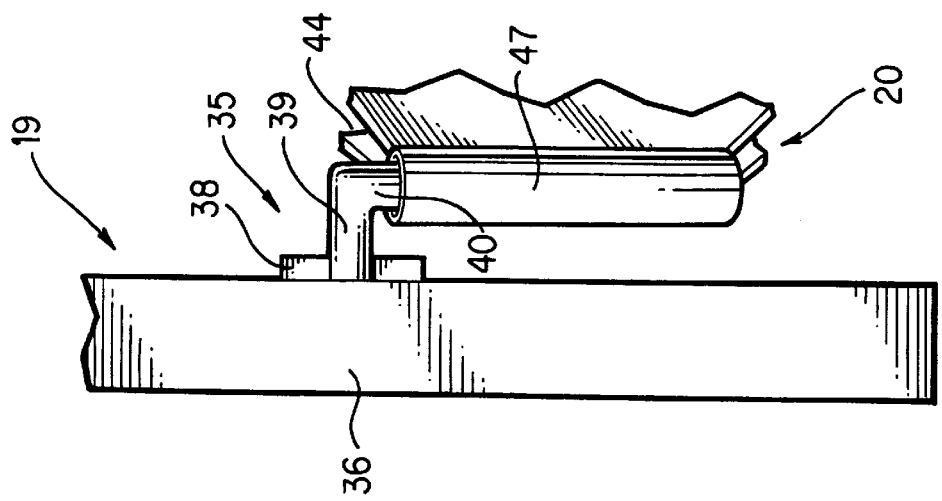
FIG. 8 is a perspective cut-away view showing rotative coupling engagement between the male coupling member on the decorative front member and the female coupling member on the cover plate of the electrical panel board.

Each male type coupling member 35 includes a foot 38, a stem 39 extending substantially perpendicular to the coupling side 36 of the decorative front member 19, and a finger 40 angled to the stem 39 at 90° and directly mating with the female type coupling member 33, as best shown in FIG. 8.

Figure 12:
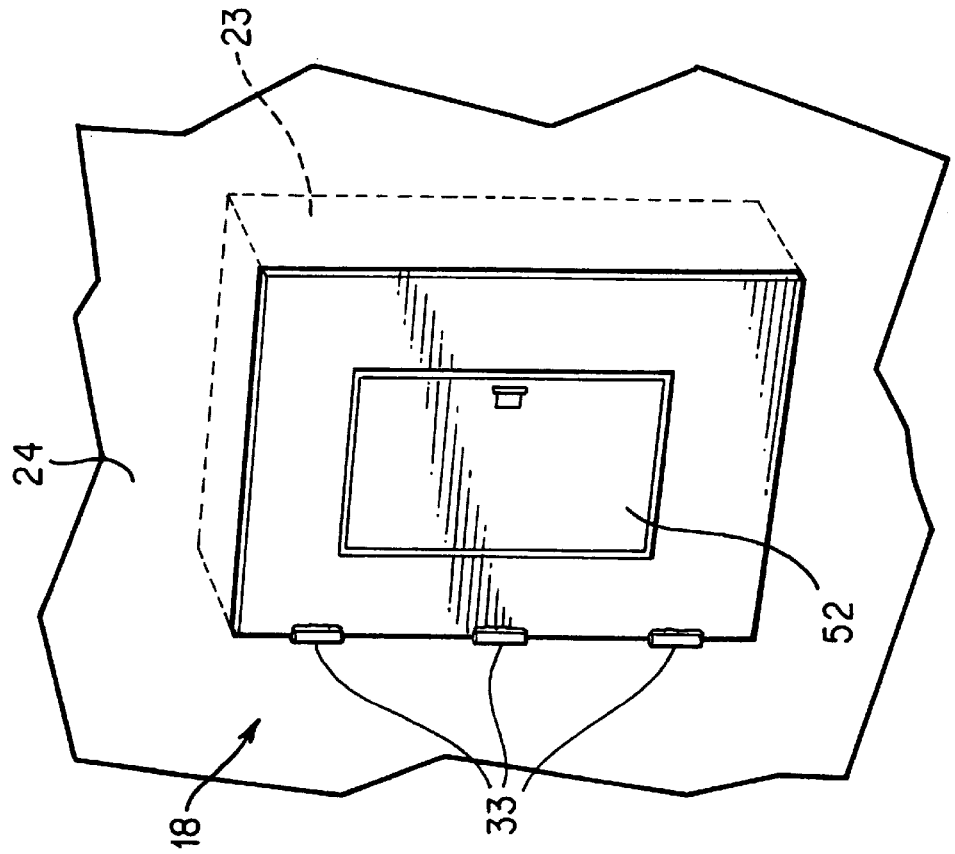
FIGS. 11 and 12 are top and front views, respectively, of alternative type of the electrical panel board (cover plate not having flanges) modified with the barrel type coupling member for receiving the male coupling member of a decorative front member according to the present invention.
Figure 11:
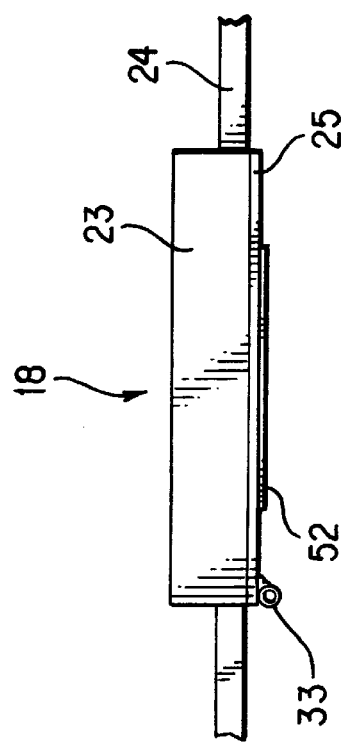

As best shown in FIGS. 3–8, the cover plate 25 or 32, may have a flange 41 extending outwardly from the opening 26 of the panel board box 23 of the electrical panel board, or, as shown in FIGS. 11 and 12, the cover plate does not have flanges extending outward from the opening 26 of the panel board box 23. Despite this difference, the principles of the present invention are equally applicable to both types of cover plates of the electrical panel boards of the subject invention.

Figure 9:
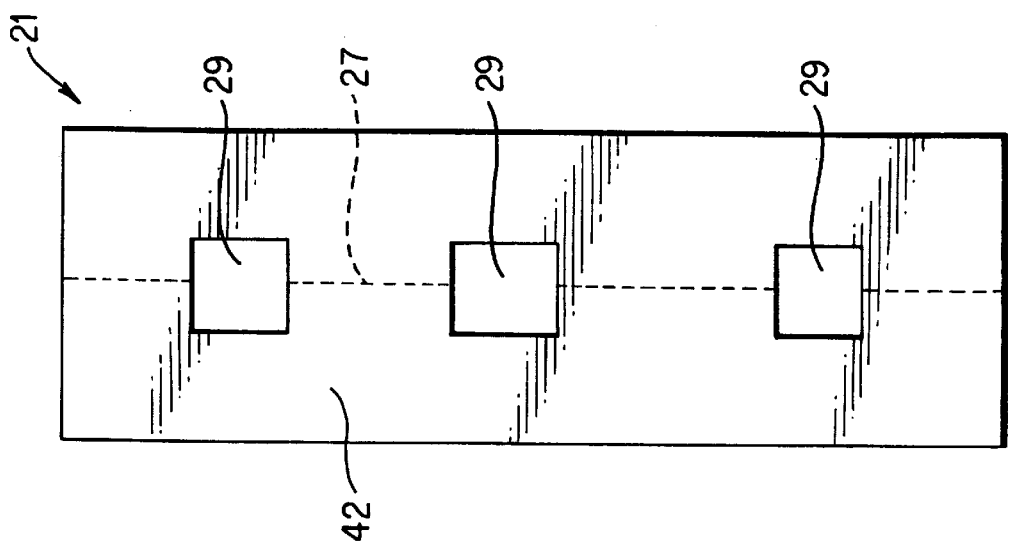
FIG. 9 is a plan view showing a position template with three indicia indicating location of barrel type hinges.

Further discussion relates to conventional electrical panel boards, although principles of the present invention are applicable also to the modified electrical panel board 31. In order to properly position the barrel type hinges 20 onto the cover plate 25, the position template, best shown in FIGS. 9 and 10, is provided in the decorative kit 17. The position template 21 includes a substantially rectangular planar member 42 foldable along the longitudinal axis 27 and having openings 29 distributed along the central longitudinal axis 27.

The rectangular planar member 42 may be formed from a thin metal or plastic which is easily foldable, so that being folded along the axis 27, the position template 21 is slid over the cover plate 25 in a vertical manner and is secured by fasteners 22 to the edge 28 of the cover plate 25. The openings 29, as shown in FIG. 10, form indicia indicating where to position the barrel type hinges 20.

Each hinge 20 includes a pair of plates 43 disposed in parallel spaced apart relationship and forming a slot 44 therebetween. The plates 43 have a common edge 45 from which two parallel fins 46 extend, supporting a barrel member 47 serving as a female type coupling member receiving the finger 40 of the male coupling member 35 of the decorative front member 19.

The barrel type hinge 20 is secured to the cover plate 25 by receiving the edge 28 of the cover plate 25 in the slot 44 between the plates 43 with the edge 28 coinciding with the edge 45 of the hinge 20, and by securing the plates 43 to the cover plate 25, on both sides thereof by fasteners 22. It is clear to those skilled in the art that each plate 43 is provided with openings (best shown in FIG. 3) for allowing the fasteners 22 to protrude therethrough.

During installation of the barrel type hinges 20 to the cover plate 25, openings in the cover plate coinciding with the openings on the plates 43 are formed to allow passing the fasteners 22 therethrough.

Figure 6:
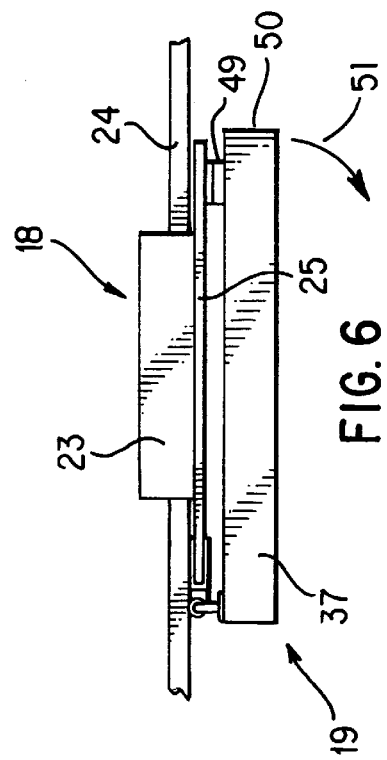
FIG. 6 is a top view of the electrical panel board camouflaged by a decorative front member of the present invention.

As best shown in FIGS. 5, 6 and 8, after the cover plate 25 has been provided with the barrel type hinges 20 attached thereto, as described in previous paragraphs, the cover plate 25 is secured to the electrical panel board 18 on the wall 24, and any of the decorative front members 19 are positioned to cover the front surface of the electrical panel board 18 by means of inserting the fingers 40 of the male type coupling member 35 on the decorative front member 19 into the barrel members 47 of the respective barrel type hinges 20 on the cover plate 25.

After being secured to the electrical panel board 18, as described above, the decorative front member 19 is capable of swinging about the axis 48, best shown in FIG. 5. In order to remain closed, the decorative front member 19 is provided with magnetic door lock assembly 49 which is a conventional magnetic door latch known to those skilled in the art. Each decorative front member 19 may be provided with one, two, or three magnet latches 49, best shown in FIGS. 3, 4, 6 and 14.

The magnetic latches 49, being magnetically attracted to the metal cover plate 25, maintain the decorative front member 19 in close position. When the electrical panel board 18 is to be serviced, the decorative front member 19 is opened by pulling the edge 50 of the decorative front member 19 in the direction, shown in FIG. 6 as directional arrow 51, thereby breaking magnetic attractive forces between the magnetic latch 49 and the metal cover plate 25 and rotating the decorative front member 19 about the axis 48. Once the decorative front member 19 is opened, still remaining attached to the cover plate 25 at the edge 28 thereof, a door 52 in the cover plate 25 can be opened and the electrical elements 53 shown in dotted lines in FIG. 14 can be checked and serviced.

The decorative front members 19 are easily interchangeable by removing the male type coupling member 35 of the decorative front member 19 from the female type coupling members 33 and by inserting the male coupling members 35 of another decorative front member 19 into the same barrel type hinges 20 as described above.

The decorative front members 19 can be provided in the decorative kits 17 and 30, in many styles and concepts, as shown in FIGS. 5, 13–15 as well as a wide variety of others. For example, for the wall clock concept, shown in FIG. 13, the decorative front member 19 may include a hinged wood cabinet 54 with a battery clock 55, and may optionally be provided with a small pull-out drawer 56. In anther implementation, for chalkboard-cork board concepts for kitchen application, shown in FIG. 14, the decorative front member 19 includes a hinged wood frame 57 with chalkboard back 58 with a shelf for chalk 59 and with a cork board 60 at the bottom of the decorative front member 19.

In yet another implementation, such as the spice rack concept, shown in FIG. 5, for kitchen applications, the decorative front member 19 may include a plurality of shelves 61 on the solid back panel 62. In still another implementation, in the cabinet front concept, shown in FIG. 15, for kitchen, hall, or room applications, the decorative front member 19 has a solid wood raised hinged panel 63 provided with a pull knob 64. Also envisioned in scope of the subject invention, but not shown in the Drawings, are other concepts, for instance, picture-in-the-frame, mirror-in-the-frame or without the frame, etc.

As described above, the decorative kit for conventional electrical panel board and for modified electrical panel board, as well as technique of installation of decorative front members to conventional cover plates or to modified cover plates, provides for easily installable, convenient and flexible in use, and attractive from an aesthetic standpoint decorative assembly which not only camouflages unattractive front surface of electrical panel boards behind the decorative cover but brings a new fresh look to the room where it is installed, while simultaneously providing easy access to the electrical elements of the load center for checking and servicing.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described. Certain features may be used independently of other features, and in certain cases, particular locations of elements may be reversed or interposed, all without departing from the spirit or scope of the invention as defined in the appended claims.

What is claimed is:

1. A decorative kit for a wall-mountable electrical panel board, comprising:
   at least one decorative front member having a longitudinal coupling side;
   at least one first coupling member affixed to said coupling side of said at least one decorative front member, said first coupling member having a longitudinally extending stem; and,
   at least one second coupling member affixed to an edge of a cover plate of an electrical panel board, said at least one second coupling member including a barrel-type hinge member mounted onto the edge of the cover plate of the electrical panel board for slidably receiving said stem therein to provide a rotatable coupling of said decorative front member with the cover plate.

2. The decorative kit of claim 1, further including a position template, said position template including a substantially rectangular planar member foldable along a central longitudinal axis thereof, and at least one indicia disposed along said central longitudinal axis, said rectangular planar member being positioned adjacent the cover plate of the electrical panel board with said central longitudinal axis thereof co-extending with the edge of the cover plate, said barrel-type hinge member being positioned at a location indicated by said at least one indicia on said position template.

3. The decorative kit of claim 2, wherein said position template further includes a plurality of said indicia distributed along said central longitudinal axis.

4. The decorative kit of claim 2, wherein said indicia is an opening formed through said position template into which said barrel-type hinge member is positioned.

5. The decorative kit of 1, further including a plurality of said barrel-type hinge members.

6. The decorative kit of claim 1, wherein the cover plate includes a flange extending outwardly from an opening of the panel board, said barrel-type hinge member being secure to an edge of the flange.

7. A method of installing a decorative front member onto a conventional electrical panel board mounted in a wall, comprising the steps of:
   (a) providing a decorative kit, said decorative kit including:
      (i) a plurality of interchangeable decorative front members, each of said decorative front members carrying at least one first coupling member on a coupling side thereof, and
      (ii) at least one second coupling member matable with said at least one first coupling member;
   (b) removing a cover plate of said conventional electrical panel board;
   (c) providing a position template having position indicia aligned with said at least one first coupling member on a respective one of said decorative front members;
   (d) securing said position template to one edge of said cover plate;
   (e) positioning and securing said at least one second coupling member to said one edge of said cover plate at a location indicated by said indicia;
   (f) remounting said cover plate carrying said at least one second coupling member to said electrical panel board; and,
   (g) coupling said at least one first and second coupling members together, thereby affixing said respective decorative front member to said electrical panel board in a relative rotative coupling arrangement with respect to said one edge of said cover plate of said electrical panel board.

8. The method of claim 7, further including the steps of:
   providing at least one barrel-type hinge;
   sliding said at least one barrel-type hinge along said edge of said cover plate towards said location indicated by said indicia, and
   securing said at least one barrel-type hinge thereat.

9. A method of installing a decorative first member onto an electrical panel board, comprising the steps of:
   modifying a cover plate of the electrical panel board by mounting at least one female coupling member thereto at a specified location adjacent one edge of said cover plate;
   mounting said modified cover plate onto the electrical panel board;
   providing a decorative kit, said decorative kit including a plurality of decorative front covers each carrying at least one male coupling member adjacent a coupling side thereof;
   selecting a respective one of said plurality of the decorative front members, and
   enageageably mating said at least one male and female coupling members, thereby installing said respective decorative front member to said modified electrical panel board.

* * * * *